(12) United States Patent
Kwon et al.

(10) Patent No.: US 10,277,729 B2
(45) Date of Patent: Apr. 30, 2019

(54) APPARATUS AND METHOD FOR TRANSMITTING AND RECEIVING HANDWRITING ANIMATION MESSAGE

(75) Inventors: Mu-Sik Kwon, Seoul (KR); Seong-Taek Hwang, Gyeonggi-do (KR); Sang-Wook Oh, Gyeonggi-do (KR); Jung-Rim Kim, Gyeonggi-do (KR); Do-Hyeon Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 790 days.

(21) Appl. No.: 13/012,189

(22) Filed: Jan. 24, 2011

(65) Prior Publication Data
US 2011/0181619 A1    Jul. 28, 2011

(30) Foreign Application Priority Data

Jan. 22, 2010 (KR) .................. 10-2010-0006102
Apr. 15, 2010 (KR) .................. 10-2010-0034609

(51) Int. Cl.
*H04M 1/725*    (2006.01)

(52) U.S. Cl.
CPC .... *H04M 1/72555* (2013.01); *H04M 1/72544* (2013.01)

(58) Field of Classification Search
USPC ........................................ 345/629, 636, 473
See application file for complete search history.

(56) References Cited

U.S. PATENT DOCUMENTS

| | | | | |
|---|---|---|---|---|
| 5,063,600 | A * | 11/1991 | Norwood | G06F 3/04883 382/187 |
| 5,230,041 | A * | 7/1993 | Dinwiddie et al. | 345/520 |
| 5,335,318 | A * | 8/1994 | Kirk | 345/639 |
| 5,467,443 | A * | 11/1995 | Johnson et al. | 345/441 |
| 5,564,005 | A * | 10/1996 | Weber et al. | 715/863 |
| 5,583,980 | A * | 12/1996 | Anderson | 345/473 |

(Continued)

FOREIGN PATENT DOCUMENTS

| | | |
|---|---|---|
| EP | 1 785 818 | 5/2007 |
| EP | 2 133 841 | 12/2009 |

(Continued)

OTHER PUBLICATIONS

Korean Office Action dated Apr. 7, 2016 issued in counterpart application No. 10-2010-0034609, 13 pages.

(Continued)

*Primary Examiner* — Motilewa Good Johnson
(74) *Attorney, Agent, or Firm* — The Farrell Law Firm, P.C.

(57) ABSTRACT

Provided is an apparatus and method for transmitting and receiving a handwriting animation message. The apparatus for transmitting a handwriting animation message includes an input unit for receiving an input of a handwriting animation message including coordinate information and time information of points being input onto a background image from a user of a transmitting mobile terminal, a controller for controlling merging or synchronization of the background image and the handwriting animation message, and a transmitter for transmitting the merged or synchronized background image and handwriting animation message to a receiving mobile terminal.

21 Claims, 13 Drawing Sheets

(56) References Cited

U.S. PATENT DOCUMENTS

| | | | |
|---|---|---|---|
| 5,754,186 A * | 5/1998 | Tam et al. .................. | 345/629 |
| 5,758,082 A * | 5/1998 | Yumoto ............. | H04M 3/5307 |
| | | | 709/219 |
| 5,768,607 A * | 6/1998 | Drews et al. ................. | 715/203 |
| 5,774,602 A * | 6/1998 | Taguchi et al. .............. | 382/314 |
| 5,856,825 A * | 1/1999 | Yumoto et al. .............. | 715/201 |
| 6,023,241 A * | 2/2000 | Clapper .................. | 342/357.32 |
| 6,173,317 B1 * | 1/2001 | Chaddha et al. ............ | 709/219 |
| 6,268,864 B1 * | 7/2001 | Chen et al. .................. | 345/428 |
| 6,408,092 B1 * | 6/2002 | Sites ............................ | 382/187 |
| 6,462,734 B1 * | 10/2002 | Vachette ..................... | 345/173 |
| 6,542,936 B1 * | 4/2003 | Mayle ................. | G06Q 10/107 |
| | | | 709/203 |
| 6,636,733 B1 * | 10/2003 | Helferich ................... | 455/412.2 |
| 6,771,266 B2 * | 8/2004 | Lui et al. ..................... | 345/442 |
| 6,798,907 B1 * | 9/2004 | Clary ................. | G06F 3/04883 |
| | | | 382/187 |
| 7,003,308 B1 * | 2/2006 | Fuoss ................. | G06F 3/04883 |
| | | | 345/173 |
| 7,120,320 B2 * | 10/2006 | Petterson ............... | G06K 9/222 |
| | | | 345/179 |
| 7,227,582 B2 * | 6/2007 | MacInnis et al. ........... | 348/512 |
| 7,293,189 B2 * | 11/2007 | Kim et al. .................... | 713/400 |
| 7,330,100 B2 * | 2/2008 | Yu ..................... | H04M 1/72552 |
| | | | 340/5.61 |
| 7,499,058 B2 * | 3/2009 | Van Ness et al. ........... | 345/581 |
| 7,499,716 B2 * | 3/2009 | Helferich ...................... | 455/458 |
| 7,516,183 B2 * | 4/2009 | Shiigi .................. | G06Q 10/107 |
| | | | 709/206 |
| 7,697,164 B2 * | 4/2010 | Matama ........................ | 358/1.9 |
| 7,864,198 B2 * | 1/2011 | Moroto .................. | G06T 11/60 |
| | | | 345/626 |
| 7,869,655 B2 * | 1/2011 | Clary et al. .................. | 382/187 |
| 8,151,316 B2 * | 4/2012 | Hui et al. ..................... | 725/135 |
| 8,196,041 B2 * | 6/2012 | Carro ............................ | 715/702 |
| 8,275,243 B2 * | 9/2012 | Kientz ................ | H04N 9/8205 |
| | | | 386/241 |
| 8,300,252 B2 * | 10/2012 | Marggraff .................... | 358/1.15 |
| 8,350,871 B2 * | 1/2013 | Gyorfi et al. ................. | 345/633 |
| 8,396,931 B2 * | 3/2013 | Rothschild .................... | 709/206 |
| 8,542,238 B2 * | 9/2013 | Niles et al. ................... | 345/473 |
| 8,782,159 B2 * | 7/2014 | Shiigi ........................... | 709/207 |
| 8,806,320 B1 * | 8/2014 | Abdo ................ | G06F 17/30017 |
| | | | 715/203 |
| 2001/0048436 A1 * | 12/2001 | Sanger ........................ | 345/467 |
| 2002/0031243 A1 * | 3/2002 | Schiller ................ | G06F 1/3203 |
| | | | 382/119 |
| 2002/0036642 A1 * | 3/2002 | Kwon et al. ................. | 345/531 |
| 2002/0093501 A1 * | 7/2002 | Lui et al. ..................... | 345/442 |
| 2003/0011643 A1 * | 1/2003 | Nishihata ..................... | 345/810 |
| 2003/0063067 A1 * | 4/2003 | Chuang .................. | G06F 3/038 |
| | | | 345/156 |
| 2003/0068491 A1 | 4/2003 | Otaki et al. | |
| 2003/0144814 A1 * | 7/2003 | Hama ................. | G06F 3/03545 |
| | | | 702/159 |
| 2003/0194990 A1 * | 10/2003 | Helferich .................... | 455/412.2 |
| 2004/0263486 A1 * | 12/2004 | Seni .................... | G06F 3/04883 |
| | | | 345/173 |
| 2005/0088418 A1 * | 4/2005 | Nguyen .............. | G06F 3/03545 |
| | | | 345/173 |
| 2005/0088698 A1 * | 4/2005 | Matama ........................ | 358/2.1 |
| 2005/0289453 A1 * | 12/2005 | Segal ........................ | G06F 1/12 |
| | | | 715/203 |
| 2006/0013368 A1 * | 1/2006 | LaBaw ...................... | 379/88.13 |
| 2006/0114239 A1 * | 6/2006 | Nakajima ........... | G06F 3/04883 |
| | | | 345/173 |
| 2006/0209802 A1 | 9/2006 | Kang et al. | |
| 2006/0221064 A1 * | 10/2006 | Sawada ................ | G06F 17/242 |
| | | | 345/173 |
| 2007/0124369 A1 * | 5/2007 | Wu .............................. | 709/204 |
| 2007/0216660 A1 * | 9/2007 | Sposato .................. | G06F 21/32 |
| | | | 345/173 |
| 2007/0288164 A1 * | 12/2007 | Gordon et al. ............... | 701/213 |
| 2008/0119235 A1 * | 5/2008 | Nielsen ................ | G06F 3/0483 |
| | | | 455/566 |
| 2008/0240569 A1 * | 10/2008 | Tonouchi ...................... | 382/186 |
| 2009/0055736 A1 | 2/2009 | Yoon | |
| 2009/0079750 A1 * | 3/2009 | Waxman et al. ............. | 345/581 |
| 2009/0098893 A1 * | 4/2009 | Huang .............. | H04M 1/72547 |
| | | | 455/466 |
| 2009/0187817 A1 * | 7/2009 | Ivashin ................. | G06F 17/241 |
| | | | 715/230 |
| 2009/0220162 A1 | 9/2009 | Clary et al. | |
| 2010/0008551 A9 * | 1/2010 | Schiller et al. ............... | 382/119 |
| 2010/0031132 A1 * | 2/2010 | Yamaji ................. | G06F 17/211 |
| | | | 715/203 |
| 2010/0067674 A1 * | 3/2010 | Lee ..................... | G06F 3/03545 |
| | | | 379/100.01 |
| 2010/0093367 A1 * | 4/2010 | Kim .................... | G06F 3/03543 |
| | | | 455/456.1 |
| 2010/0130257 A1 * | 5/2010 | Jang ........................ | G06F 3/016 |
| | | | 455/566 |
| 2010/0210332 A1 * | 8/2010 | Imai ........................ | A63F 13/10 |
| | | | 463/7 |
| 2010/0214111 A1 * | 8/2010 | Schuler et al. ............. | 340/686.1 |
| 2010/0289739 A1 * | 11/2010 | Tamura ................ | G09B 29/007 |
| | | | 345/156 |
| 2010/0318573 A1 * | 12/2010 | Yoshikoshi ........ | G01C 21/3611 |
| | | | 707/802 |
| 2010/0318621 A1 | 12/2010 | Aono et al. | |
| 2011/0007077 A1 * | 1/2011 | Kamath et al. ............... | 345/473 |
| 2011/0157028 A1 * | 6/2011 | Stallings .............. | G06F 3/04883 |
| | | | 345/173 |
| 2011/0230215 A1 * | 9/2011 | Kim .............................. | 455/466 |
| 2012/0019487 A1 * | 1/2012 | Kazamaki ............ | G06F 17/241 |
| | | | 345/179 |
| 2012/0105917 A1 * | 5/2012 | Saito ..................... | G06F 3/0321 |
| | | | 358/448 |

FOREIGN PATENT DOCUMENTS

| | | |
|---|---|---|
| KR | 1020010107004 | 12/2001 |
| KR | 1020060099385 | 9/2006 |
| KR | 1020070025225 | 3/2007 |
| KR | 1020070066661 | 6/2007 |
| WO | WO 2009/069744 | 6/2009 |

OTHER PUBLICATIONS

European Search Report dated May 9, 2017 issued in counterpart application No. 11151055.8-1972, 9 pages.

Korean Office Action dated Jan. 3, 2017 issued in counterpart application No. 10-2016-0175387, 9 pages.

* cited by examiner

APPARATUS AND METHOD FOR TRANSMITTING AND RECEIVING HANDWRITING ANIMATION MESSAGE

PRIORITY

This application claims priority under 35 U.S.C. § 119(a) to a Korean Patent Application filed in the Korean Intellectual Property Office on Jan. 22, 2010 and assigned Serial No. 10-2010-0006102 and a Korean Patent Application filed in the Korean Intellectual Property Office on Apr. 15, 2010 and assigned Serial No. 10-2010-0034609, the entire disclosures of which are incorporated herein by reference.

BACKGROUND OF THE INVENTION

1. Field of the Invention

The present invention relates generally to text message transmission, and more particularly, to an apparatus and method for transmitting and receiving a handwriting animation message service.

2. Description of the Related Art

With the development of various technologies in wired or wireless communication, multimedia and manufacturing improvements in hardware such as in Central Processing Units (CPU) and memory, power charging, and so forth, mobile terminal functionality has been emphasized more and more. Conventionally, a mobile terminal transmits necessary data to a communication partner through voice communication. However, since transmission and reception of text messages became possible desired data can be transmitted to the partner by using a Short Message Service (SMS) including simple text data in a situation where voice communication is not allowed or simple data needs to be transmitted.

The SMS has evolved into a Long Message Service (LMS) for long text data and a Multimedia Message Service (MMS) for multimedia files such as still or moving images, through which users can be provided with various benefits. In particular, the MMS which transmits a multimedia file, unlike the SMS or the LMS which merely transmits text data, has been increasing in demand from users due to extensibility in expression. The following describes a method for transmitting desired data by using the MMS.

FIG. 1 illustrates a mobile terminal which performs information transmission using a conventional MMS.

Referring to FIG. 1, a user may create an MMS message by inputting desired characters or attaching a desired image. An MMS input scheme illustrated in FIG. 1 is configured such that the user inputs a character using a keypad 105, but in a mobile terminal supporting a touch screen, the user may input the character directly onto the screen by using a finger or other input means such as a stylus pen. By using a file attachment box 103 provided below, a character input window 101, the user may retrieve an image stored in memory and attach the retrieved image.

However, the currently used MMS transmits data including a previously stored still image or moving image. When a transmitting mobile terminal desires to transmit handwriting content by using the MMS, the handwriting content has to be converted into a still image or moving image file by using a separate program, and then stored and transmitted. That is, when a receiving mobile terminal receives an image included in the MMS message, the image appears like a single still image and the handwriting content cannot be sequentially reproduced in the order the handwritten data is created by a user of the transmitting mobile terminal. As a result, handwriting of the user of the transmitting mobile terminal is not delivered with the appearance of animation.

Moreover, when a plurality of still images or moving images are transmitted, a user of the receiving mobile terminal has to download the attached plurality of still images or moving images and check each of them to identify an order of the still images or moving images created by the user of the transmitting mobile terminal.

SUMMARY OF THE INVENTION

Accordingly, an aspect of the present invention is to provide an apparatus and method, by which one or more handwriting animation messages and a particular background image are synchronized as a single group and transmitted to a receiving mobile terminal to effectively transmit the handwriting animation messages and the particular background image.

Another aspect of the present invention is to provide an apparatus and method, by which time information and coordinate information, of points forming a handwriting animation message, are stored in a particular region of a final still image where the handwriting animation message is completed on a particular background image, the final still image is transmitted to a receiving mobile terminal, and the particular background image remaining after removal of the handwriting animation message from the final still image is reconstructed to reproduce the handwriting animation message on the restored particular background image.

According to an aspect of the present invention, there is provided an apparatus for transmitting a handwriting animation message. The apparatus includes an input unit for receiving an input of a handwriting animation message including coordinate information and time information of points being input onto a background image from a user of a transmitting mobile terminal, a controller for controlling merging or synchronization of the background image and the handwriting animation message, and a transmitter for transmitting the merged or synchronized background image and handwriting animation message to a receiving mobile terminal.

According to another aspect of the present invention, there is provided an apparatus for receiving a handwriting animation message. The apparatus includes a receiver for receiving a background image and a handwriting animation message including coordinate information and time information of points being input onto the background image, the background image and the handwriting animation message being merged or synchronized with each other, a controller for controlling the handwriting animation message to be reproduced on the background image by using the merged or synchronized background image and handwriting animation message, and an output unit for sequentially reproducing and outputting the handwriting animation message under the control of the controller.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described in detail with reference to the accompanying drawings. In the following description, detailed components are discussed to assist a comprehensive understanding of the present invention. Those of ordinary skill in the art will recognize that various changes and modifications of the details can be made without departing from the scope and spirit of the invention.

A handwriting animation message involves a user of a transmitting mobile terminal touching an input unit such as a touch screen by using an input means such as a finger or a stylus pen to complete a handwriting input. The input handwriting information includes one or more points, each of which includes time information and coordinate information. When coordinate information is transmitted to a receiving mobile terminal, the receiving mobile terminal reproduces the handwriting information based on the transmitted information as if the user of the transmitting mobile terminal is directly handwriting, such that the handwriting and sensibility of the user of the transmitting mobile terminal can be lively carried.

Figure 1:
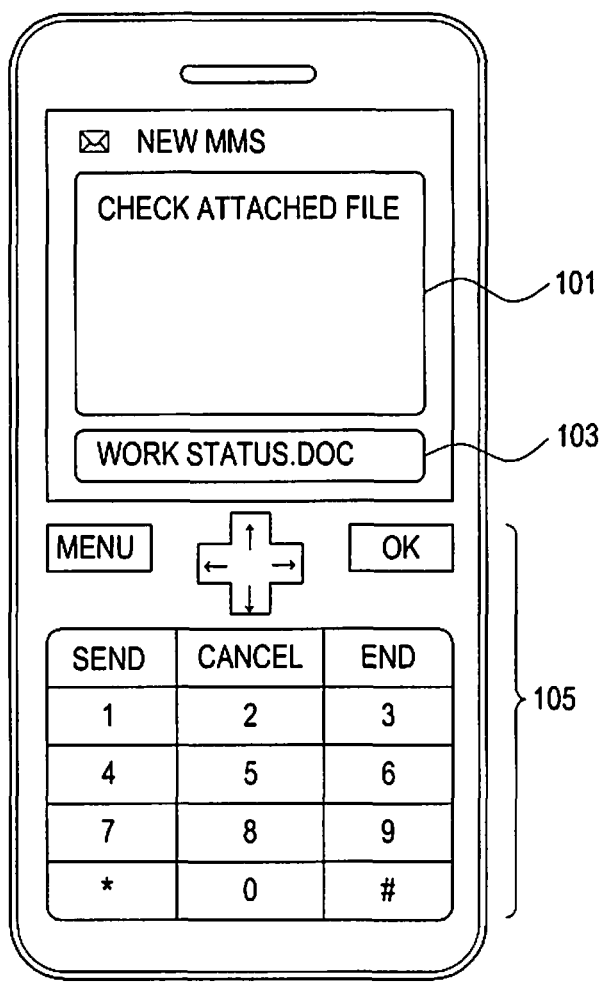
FIG. 1 illustrates a mobile terminal which performs information transmission using a conventional MMS.
Figure 2:
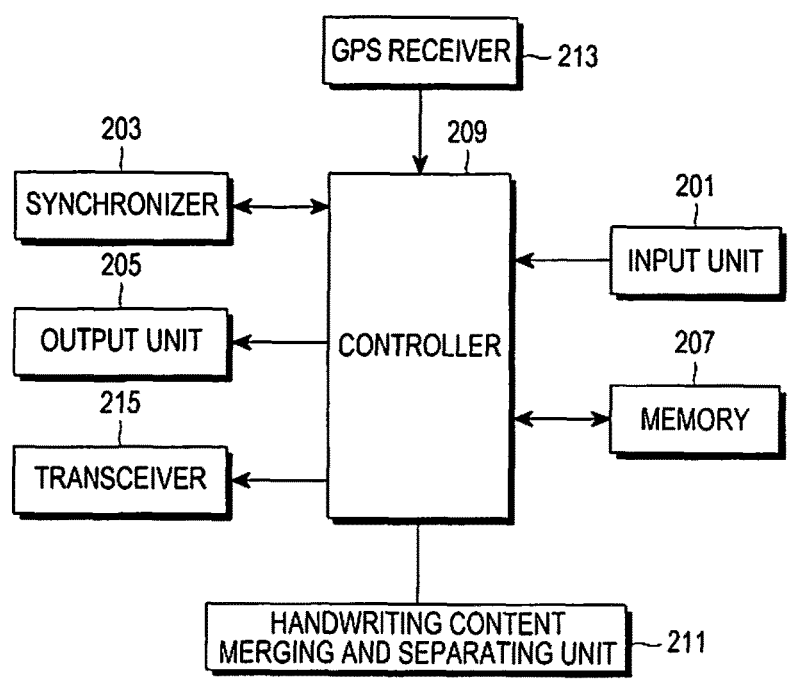
FIG. 2 is a block diagram of a mobile terminal for generating and reproducing a handwriting animation message according to an embodiment of the present invention.

FIG. 2 is a block diagram of a mobile terminal for generating and reproducing a handwriting animation message according to an embodiment of the present invention. Referring to FIG. 2, the mobile terminal includes an input unit 201, a synchronizer 203, an output unit 205, a memory 207, a controller 209, a handwriting content merging and separating unit 211, a Global Positioning System (GPS) receiver 213, and a transceiver 215.

Referring to FIG. 2, the input unit 201 receives an input of one or more handwriting animation messages from a user. One handwriting animation message includes a plurality of points, each of which includes unique coordinate information and time information. Handwriting data includes values expressing the coordinate information and the time information of each point as data. The synchronizer 203 synchronizes the handwriting data expressing the coordinate information and the time information of each point as data with a background image. The synchronization may be performed by using a message identifier, more specifically, the various information contained in the message identifier. The synchronization may also be performed when necessary according to user's setting. The output unit 205 sequentially reproduces the one or more handwriting animation messages on the background image.

The handwriting content merging and separating unit 211 generates a final still image by merging a particular background image and handwriting content generated on the particular background image, and separates the particular background image and the handwriting content from the final still image. The final still image is a still image shown such that the completed handwriting content overlaps on the particular background image, and is later encoded into a format such as a Joint Photographic Group (JPG) format or a Graphics Interchange Format (GIF). A particular region of the final still image may include at least one of stroke information of handwriting content or pixel information of the particular background image. Although the handwriting content merging and separating unit 211 is illustrated as a single component in FIG. 2, it may also include separate units, a handwriting content merging unit and a handwriting content separating unit.

The memory 207 stores the particular background image, one or more handwriting data, and one or more final still images, and also stores a map application interworking with a Global Positioning System (GPS).

A GPS receiver 213 receives location information of a transmitting mobile terminal or location information desired by the transmitting mobile terminal through a GPS. The received location information may be output on a screen through interworking with the previously stored map application. The GPS receiver 213 may also perform a navigation function at the request of a user.

The controller 209 outputs the one or more handwriting data input through the input unit 201 and the background image stored in the memory 207 to the synchronizer 203, and sequentially reproduces the synchronized background image and one or more handwriting animation messages. The controller 209 also stores stroke information of the handwriting content and extracts the stroke information of the merged handwriting content from the final still image. The transceiver 215 transmits and receives the handwriting animation message or the background image. The transceiver 215 may also include separate units, a transmitter and a receiver.

Figure 3:
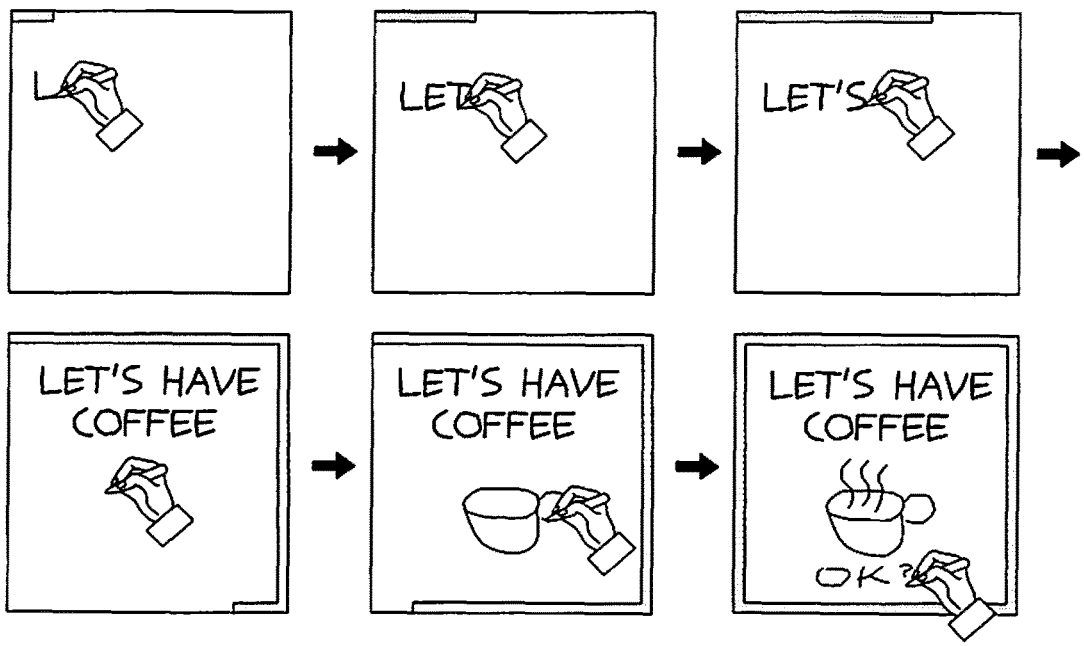
FIG. 3 is a diagram for describing a process of generating a handwriting animation message based on sequential time information according to an embodiment of the present invention.

FIG. 3 is a diagram for describing a process of generating a handwriting animation message based on sequential time information according to an embodiment of the present invention.

Referring to FIG. 3, each point includes unique coordinate information and time information, and each time when a single point or a group of points is generated, encoding is performed to generate a code and the code is displayed in an edge of the screen on a real time basis. To minimize any damage to an original image, the code is displayed in the edge of the screen. When a message "Let's have coffee" is handwritten as illustrated in FIG. 3, different codes are generated according to coordinate information and time information of respective points, and are sequentially displayed in an edge of the screen simultaneously with display of the points on the screen.

When an input operation of a handwriting animation message is artificially terminated or generated codes fill the entire edge of the screen, a code indicating an end of the handwriting animation message is generated and stored in an arbitrary region of the edge of the screen, and then a final still image is generated and encoded into an image file in a particular format, such as a Joint Picture Experts Group (JPEG) format or a GIF. In FIG. 3, the codes are generated in the edge of the screen clockwise from the left top, but such a configuration is subject to change according to user's setting.

Figure 4:
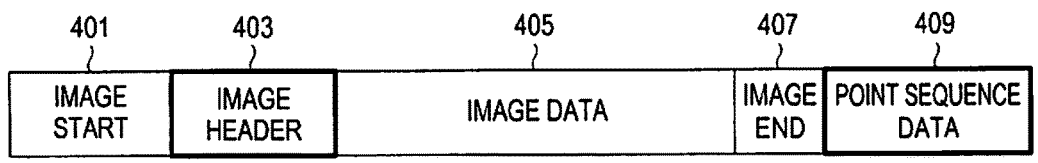
FIG. 4 is a diagram for describing a process of storing coordinate information and time information of points forming a handwriting animation message according to an embodiment of the present invention.

FIG. 4 is a diagram for describing a process of storing coordinate information and time information of points forming a handwriting animation message according to an embodiment of the present invention. Although the coordinate information and the time information of the generated points are coded and stored in the edge of the screen in FIG. 3, a final still image is generated and encoded into an image file in a particular format, and then handwriting data expressing the coordinate information and the time information of the generated points as data is stored in a particular one of one or more fields forming the image file in FIG. 4. The particular format may be a JPEG format or a GIF format. The image file illustrated in FIG. 4 includes an image start field 401, an image header field 403, an image data field 405, and an image end field 407, and may also include a point sequence data field 409.

Referring to FIG. 4, the image start field 401 and the image end field 407 store data indicating a start of a particular image format and an end of the particular image format, respectively. The image data field 405 stores a value expressing the final still image as data. Handwriting data expressing coordinate information and time information of points forming a handwriting animation message as data is stored in the image header field 403. Behind the image end field 407, the point sequence data field 409, instead of the image header field 403, may be added to store the handwriting data.

The scheme in FIG. 3 encodes the coordinate information and the time information of points and stores them in the edge of the final still image, such that the amount of the handwriting data that can be stored is limited to an edge region; whereas the scheme in FIG. 4 encodes the final still image into an image file and then generates fields to store the handwriting data, such that a large amount of handwriting data can be stored regardless of storage capacity. Next, a process of reproducing the handwriting animation message generated in FIG. 3 or FIG. 4 will be described.

Figure 5:
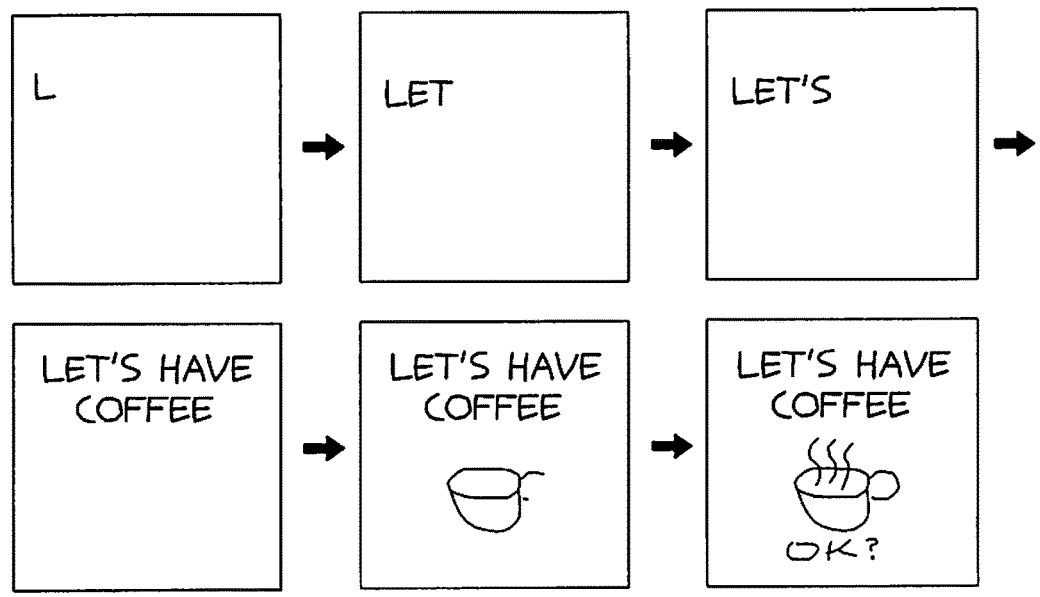
FIG. 5 is a diagram for describing a process of reproducing a handwriting animation message based on sequential time information according to an embodiment of the present invention.

FIG. 5 is a diagram for describing a process of reproducing a handwriting animation message based on sequential time information according to an embodiment of the present invention. Even if the handwriting animation messages are generated in different ways illustrated in FIGS. 3 and 4, a mobile terminal supporting a handwriting animation message service reproduces the differently generated handwriting animation messages in the same manner.

Referring to a reproduction process when a handwriting animation message is generated as illustrated in FIG. 3, decoding is performed clockwise from a code corresponding to a start of a handwriting animation message, and the handwriting animation message is reproduced on the output unit in real time. For example, if a handwriting animation message "Let's have coffee" is received, one or more codes encoded based on coordinate information and time information of respective points are decoded and those points are sequentially reproduced on the screen by using the decoded information. The one or more codes displayed in an edge of the screen of the transmitting mobile terminal are not displayed on the output unit of the receiving mobile terminal.

Referring to a reproduction process when a handwriting animation message is generated as illustrated in FIG. 4, handwriting data included in a particular field of an image file is analyzed and a handwriting animation message corresponding to the handwriting data is reproduced on the screen in real time. For example, if a handwriting animation message "Let's have coffee" is received, a plurality of points are sequentially reproduced on the screen according to the handwriting data expressing coordinate information and time information of the respective points as data, contained in the image header field 403 or the point sequence data field 409.

Next, a description will be made of a method in which if the handwriting data expressing the coordinate information and the time information of the plurality of points forming the handwriting animation message as data is transmitted together with a plurality of background images through an MMS, synchronization is performed between the handwriting data or the background images prior to the transmission to allow a user of a receiving mobile terminal to sequentially reproduce a desired handwriting animation message on a desired background image.

Figure 6:
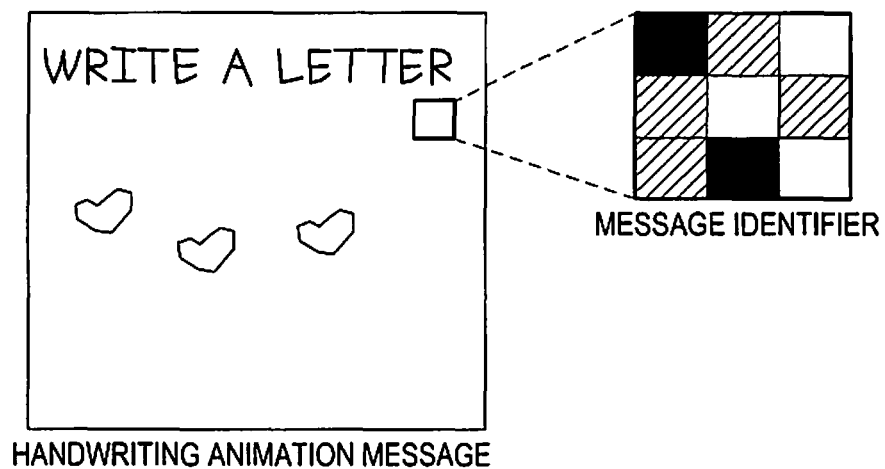
FIG. 6 is a diagram for describing a process of storing message identifiers according to an embodiment of the present invention.
Figure 6:
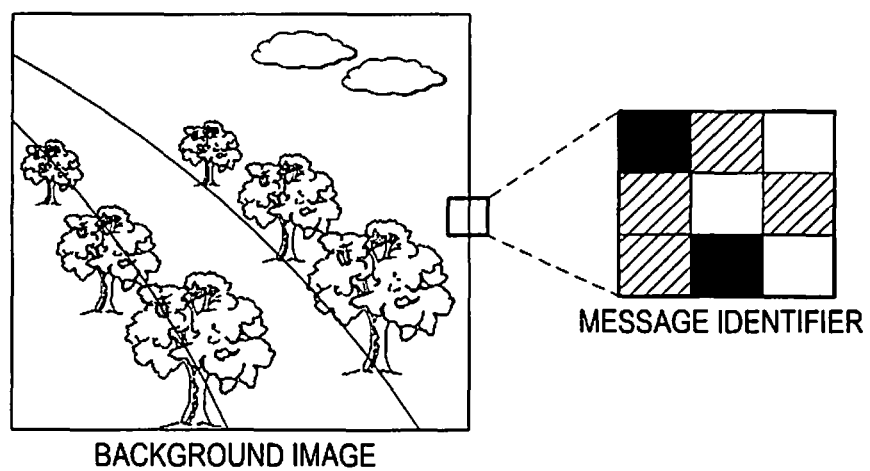

FIG. 6 is a diagram for describing a process of storing message identifiers according to an embodiment of the present invention. A message identifier is used to synchronize handwriting data with background images as a single group. When a plurality of background images and a plurality of handwriting data are transmitted together, the same message identifier is given to a particular image and particular handwriting data to synchronize them as a single group.

Referring to FIG. 6, a handwriting animation message "Write a letter" may contain a message identifier stored in an arbitrary region of an edge of the screen as in FIG. 3, or added to and stored in a particular field as in FIG. 4. The message identifier may also be concealed and then stored in an arbitrary region by adjusting an image brightness level or encoding the message identifier. The message identifier is then expressed as data, together with coordinate information and time information of a plurality of points forming the handwriting animation message. In a background image, the message identifier is stored in an arbitrary region of the edge of the screen as in FIG. 3 to minimize damage to the original image. Also in the background image, the message identifier may be concealed by adjusting the brightness level of the edge or encoding the message identifier.

Figure 7:
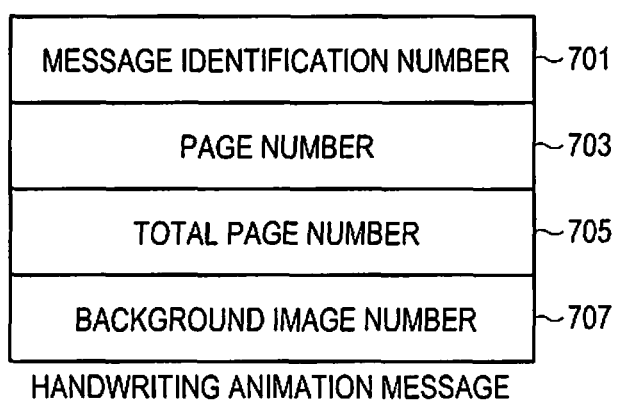
FIG. 7 is a diagram illustrating internal structures of message identifiers according to an embodiment of the present invention.
Figure 7:
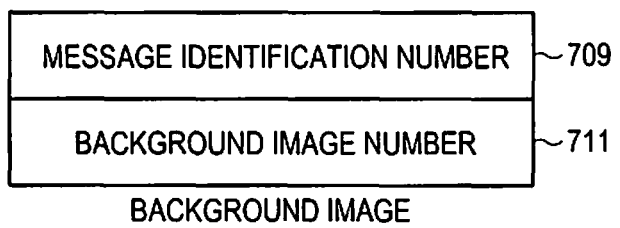

FIG. 7 is a diagram illustrating internal structures of message identifiers according to an embodiment of the present invention. The internal structures of the message identifiers may change according to a handwriting animation message and a background image.

Referring to FIG. 7, a message identifier of a handwriting animation message includes a message identification number 701, a page number 703, a total page number 705, and a background image number 707. The message identifier number 701 is used to identify a handwriting animation message and a background image having the same message identifier. If a handwriting animation message and a background image have the same message identification number, they are synchronized as a single group. For example, if the message identification number 709 of the background image and the message identification number 701 of the handwriting animation message are the same, they are synchronized in a single group and the handwriting animation message is reproduced on the synchronized background image.

The page number 703 indicates an order of reproduction of a plurality of handwriting animation messages synchronized with a background image. For example, if three handwriting animation messages are synchronized with a background image, the page number 703 is given to each of them to determine an order of reproduction.

The total page number 705 indicates the total number of synchronized handwriting animation messages, and the background image number 707 indicates a number of a background image to be used as a background. If the background image number 707 is empty, a corresponding handwriting animation message is reproduced without any background image.

A message identifier of a background image includes the message identification number 709 and a background image number 711. The message identification number 709 is used to identify a handwriting animation message having the same message identifier. If a handwriting animation message has the same message identifier as the message identification number 709 of the background image, they are synchronized as a single group. The background image number 711 indicates a unique number of the background image. If there is a handwriting animation message having the same background image number as the background image number 711 of the background image, the background image is used as a background during reproduction of the handwriting animation message.

Figure 8:
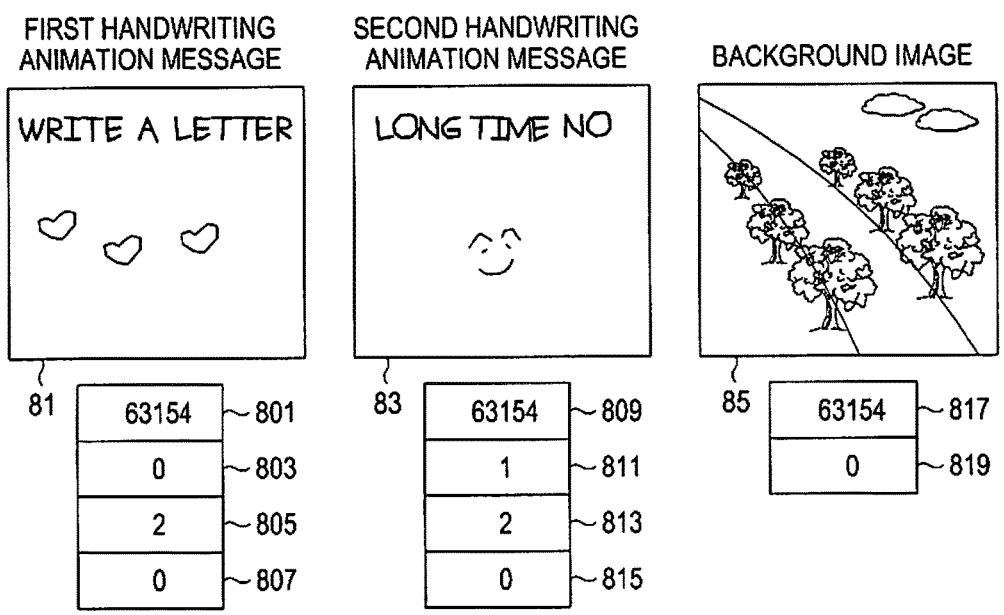
FIG. 8 is a diagram for comparing message identifiers according to an embodiment of the present invention.

FIG. 8 is a diagram for comparing message identifiers according to an embodiment of the present invention. In FIG. 8, message identifiers of a first handwriting animation message and a second handwriting animation message and a message identifier of a background image are illustrated.

Referring to FIG. 8, it can be seen that a message identification number 801 of the first handwriting animation message 81, a message identification number 809 of the second handwriting animation message 83, and a message identification number 817 of the background image 85 are all "63154". That is, the first handwriting animation message 81, the second handwriting animation message 83, and the background image 85 belong to the same group, and thus are synchronized as a single group. An order of reproduction is determined by page numbers included in the message identifiers of the two handwriting animation messages. Since a page number 803 of the first handwriting animation message 81 is "0" and a page number 811 of the second handwriting animation message 83 is "1", the first handwriting animation message 81 is first reproduced and then the second handwriting animation message 83 is reproduced. The total number of handwriting animation messages is 2, such that total page numbers 805 and 813 of the first handwriting animation message 81 and the second handwriting animation message 83 are all "2".

In addition, background image numbers 807 and 815 of the first handwriting animation message 81 and the second handwriting animation message 83 are all "0", and a background image number 819 of the background image 85 is also "0", such that the first handwriting animation message 81 and the second handwriting animation message 83 are sequentially reproduced on the background image. If the background image numbers 807 and 815 of the first handwriting animation message 81 and the second handwriting animation message 83 are empty, the first handwriting animation message 81 and the second handwriting animation message 83 are reproduced without the background image 85.

Figure 9:
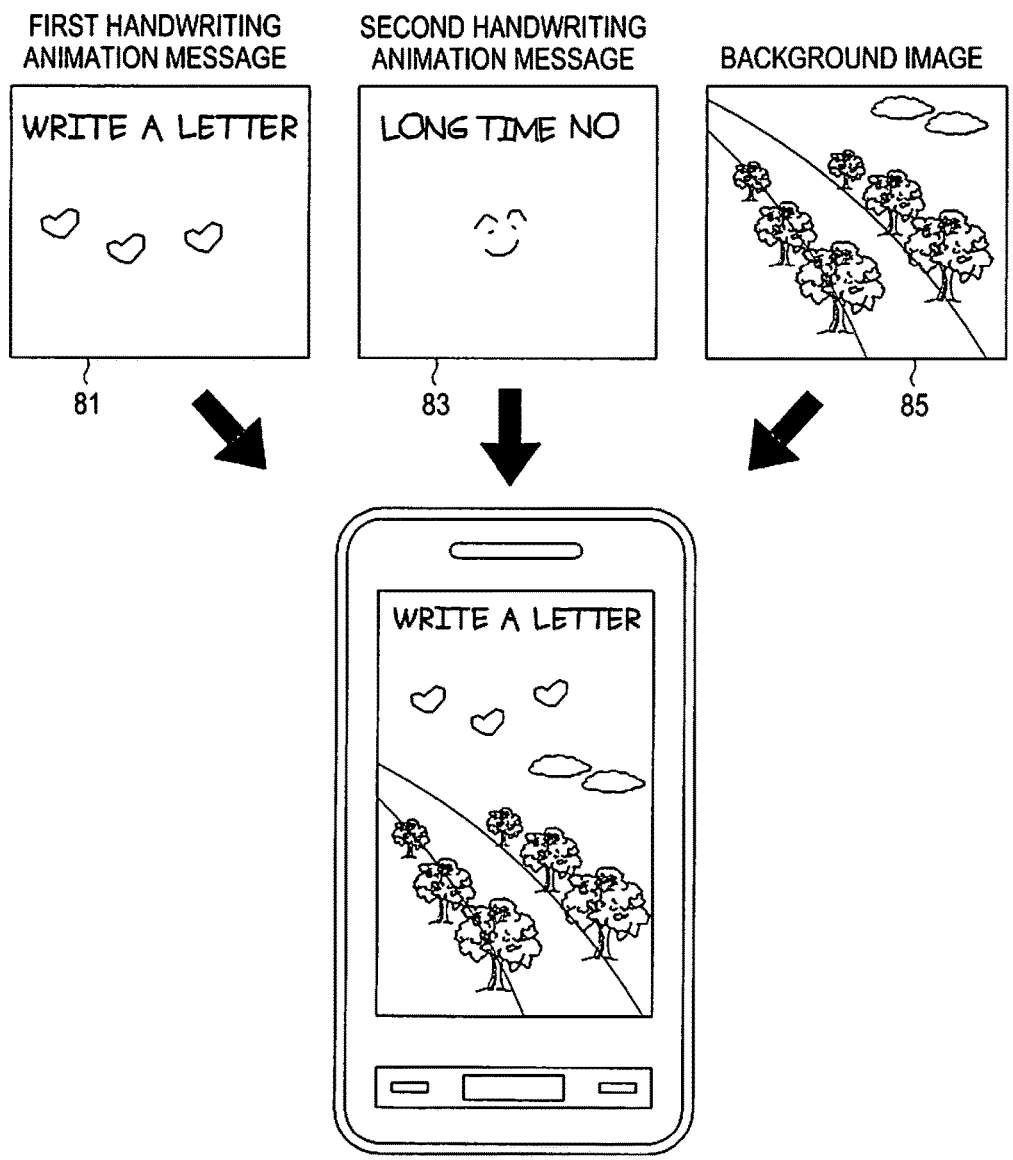
FIG. 9 is a diagram for describing reproduction of handwriting animation messages by using message identifiers according to an embodiment of the present invention.

FIG. 9 is a diagram for describing reproduction of handwriting animation messages by using message identifiers according to an embodiment of the present invention.

Referring to FIG. 9, when the first handwriting animation message 81, the second handwriting animation message 83, and the background image 85 are synchronized as a single group, then the first handwriting animation message 81 and the second handwriting animation message 83 may be reproduced on the background image 85 according to the page numbers and the background image numbers included in the message identifiers. A reproduction time may change according to user's setting. For example, reproduction of the second handwriting animation message 83 may start after completion of reproduction of the first handwriting animation message 81, or reproduction of the second handwriting animation message 83 may start during reproduction of the first handwriting animation message 81.

While a process of expressing coordinate information and time information of points forming a handwriting animation message and a message identifier as data and transmitting the data is omitted in FIGS. 7, 8, and 9, a transmitting mobile terminal expresses the handwriting animation message in which the message identifier is stored as handwriting data and then transmits the handwriting data to a receiving mobile terminal which then may identify a background image synchronized with the handwriting animation message by using the message identifier contained in the handwriting data.

Figure 10:
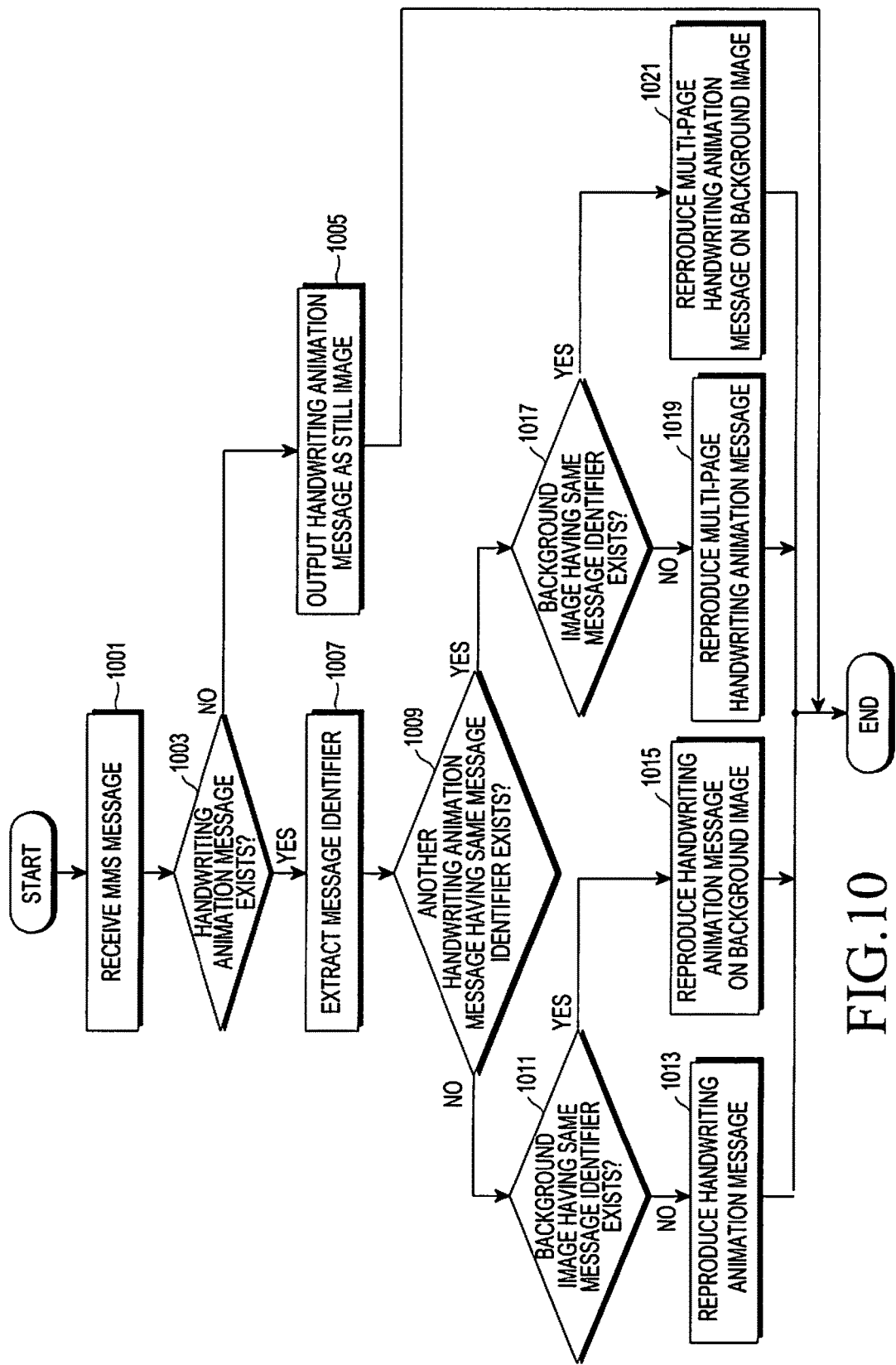
FIG. 10 is a flowchart illustrating a process of reproducing a handwriting animation message by using message identifiers according to an embodiment of the present invention.

FIG. 10 is a flowchart illustrating a process of reproducing a handwriting animation message by using message identifiers according to an embodiment of the present invention.

Referring to FIG. 10, in Step 1001, a receiving mobile terminal receives an MMS message from a transmitting mobile terminal. In Step 1003, the receiving mobile terminal determines whether handwriting data exists in the received MMS message. If handwriting data does not exist in the received MMS message, the receiving mobile terminal outputs a general image included in the MMS message on the screen in Step 1005. If handwriting data exists in the received MMS message, the receiving mobile terminal extracts a message identifier of the handwriting data in Step 1007. The message identifier includes a message identification number, a page number, a total page number, and a background image number.

In Step 1009, the receiving mobile terminal determines whether other handwriting data exists in the MMS message and if so, the receiving mobile terminal extracts a message identifier of other handwriting data to determine whether a message identification number of the extracted message identifier of other handwriting data is the same as that of the message identifier extracted in Step 1007. If they are the same as each other, the receiving mobile terminal determines whether there exists a background image having the same message identification number as those of the handwriting data in Step 1017. If there is such a background image, the receiving mobile terminal sequentially reproduces two or more handwriting animation messages on the background image in Step 1021. If there is no background image having the same message identification number, the receiving mobile terminal sequentially reproduces the two or more handwriting animation messages without a background image in Step 1019.

If there does not exist other handwriting data or the same message identification number in the MMS message in Step 1009, the receiving mobile terminal determines whether there exists a background image having the same message identification number as that of the message identifier of the handwriting data in Step 1011. If there exists the background image having the same message identification number, the receiving mobile terminal reproduces the handwriting animation message on the background image in Step 1015. If there is no such a background image, the receiving mobile terminal reproduces the handwriting animation message without a background image in Step 1013.

Next, a description will be made of a process in which when a final still image including handwriting stroke information of handwriting content is transmitted without synchronization, a particular background image and handwriting content are separated and thus handwriting animation messages are sequentially reproduced on the original particular background image.

Figure 11:
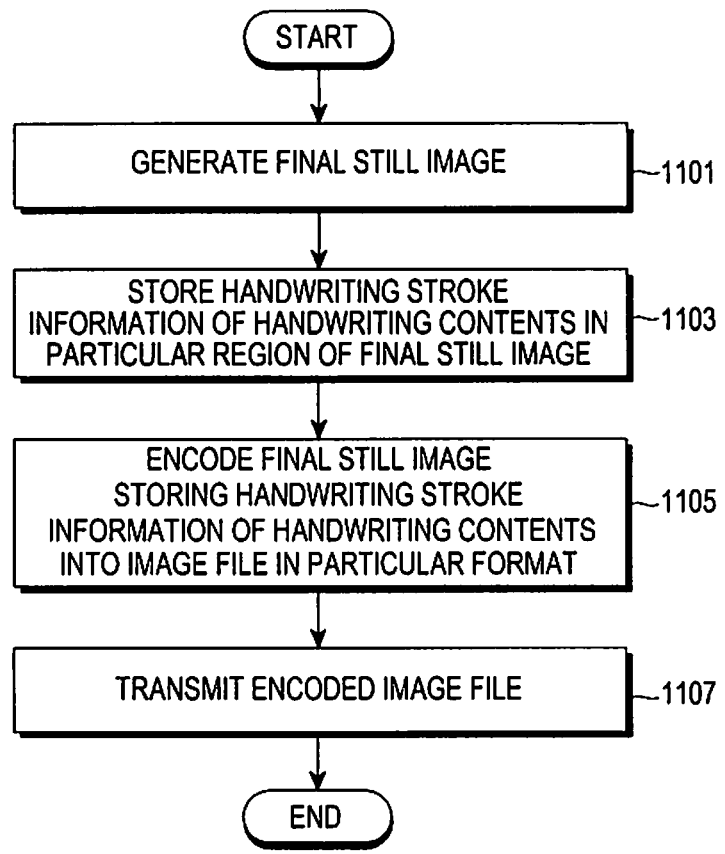
FIG. 11 is a flowchart illustrating a process of generating a final still image including handwriting stroke information of handwriting content according to an embodiment of the present invention.

FIG. 11 is a flowchart illustrating a process of generating a final still image including handwriting stroke information of handwriting content according to an embodiment of the present invention.

Referring to FIG. 11, a transmitting mobile terminal generates a final still image shown such that completed handwriting content overlaps on a particular background image in Step 1101. In Step 1103, the transmitting mobile terminal stores handwriting stroke information of the handwriting content in a particular region of the final still image. Herein, the particular region may change according to user's setting. For example, the handwriting stroke information of the handwriting content may be stored, together with coordinate information and time information of points forming a handwriting animation message, in a header field of the final still image or in a new generated field. In Step 1105, the transmitting mobile terminal encodes the final still image including the handwriting stroke information of the handwriting content into an image file in a particular format. The particular format may be a JPEG format or a GIF. The final still image may also be encoded into an image file in another format according to user's setting. When the handwriting animation message is generated with colors, it is encoded, together with pixel information of the points, into an image file in a particular format. In Step 1107, the image file encoded in the particular format is transmitted to a receiving mobile terminal.

Although not illustrated in FIG. 11, the transmitting mobile terminal may store pixel information of the particular background image, together with the handwriting stroke information of the handwriting content, in a particular region of the final still image, to make it easy to later extract handwriting content information.

Figure 12:
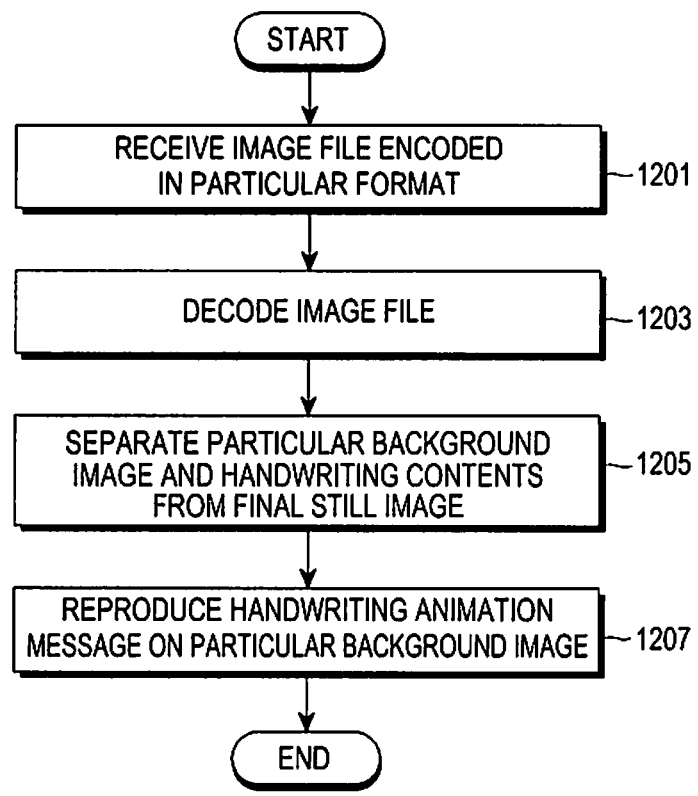
FIG. 12 is a flowchart illustrating a process of extracting handwriting stroke information of handwriting content from a final still image according to an embodiment of the present invention.

FIG. 12 is a flowchart illustrating a process of extracting handwriting stroke information of handwriting content from a final still image according to an embodiment of the present invention.

Referring to FIG. 12, a receiving mobile terminal receives an image file encoded into a particular format from a transmitting mobile terminal in Step 1201.

In Step 1203, the receiving mobile terminal decodes the encoded image file into a final still image. A particular region of the decoded final still image includes coordinate information and time information of points forming a handwriting animation message and handwriting stroke information of handwriting content. In Step 1205, the receiving mobile terminal separates a particular background image and the handwriting content from the final still image by using an inpaint method for restoring a damaged, discolored, or erased portion of an image, thereby reconstructing the original particular background image on which the handwriting content has not yet been generated. In Step 1207, the receiving mobile terminal sequentially reproduces the handwriting animation message on the original particular background image by using the coordinate information and the time information of the points forming the handwriting animation message, contained in the particular region of the final still image.

Although not illustrated in FIG. 12, when pixel information of the particular background image is additionally included in the particular region of the final still image, the pixel information of the particular background image hidden by the handwriting content is extracted to reconstruct the original particular background image on which the handwriting content has not yet been generated. For the final still image where color values of a region of the particular background image overlapping the handwriting content are blended, the original particular background image may be reconstructed using Equation (1) below.

$$X1 = 8 \times Y - 7 \times X2 \tag{1},$$

where X1 represents a color value of an original particular background image, X2 represents a color value of handwriting content, and Y represents a color value of a blended region.

When a transmitting mobile terminal desires to transmit its location to a receiving mobile terminal by using a handwriting animation message, it may replace a particular background image with map information of a map application, as will be described in detail below. In the present invention, it is assumed that the same map application is stored in the transmitting mobile terminal and the receiving mobile terminal.

Figure 13:
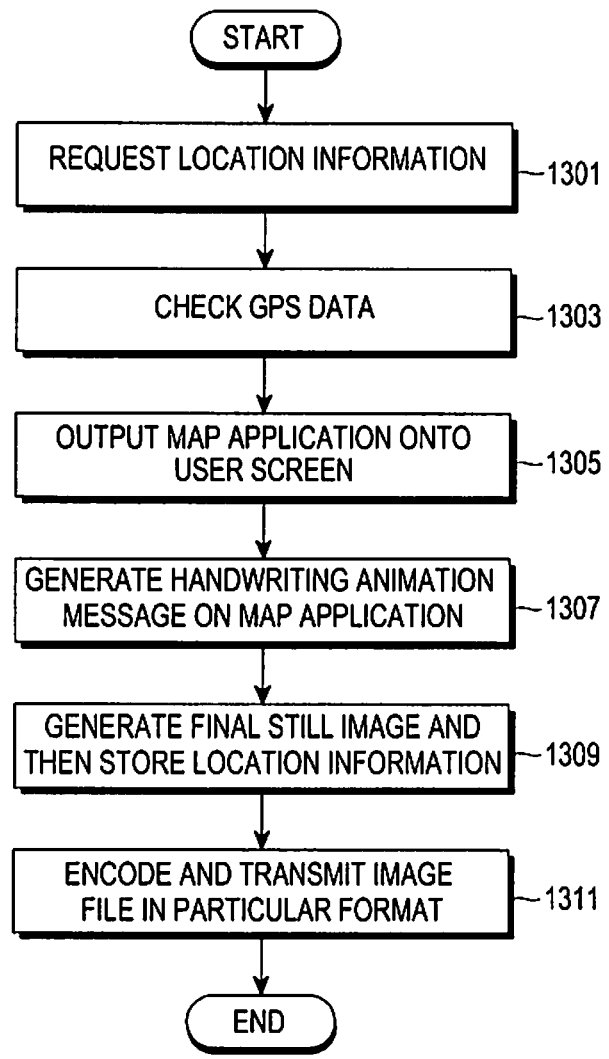
FIG. 13 is a flowchart illustrating a process of generating a handwriting animation message with map information as a background image according to an embodiment of the present invention.

FIG. 13 is a flowchart illustrating a process of generating a handwriting animation message with map information as a background image according to an embodiment of the present invention.

Referring to FIG. 13, the transmitting mobile terminal requests its location information before generating a handwriting animation message in Step 1301. In Step 1303, the transmitting mobile terminal receives and checks GPS data corresponding to its location information through a GPS receiver. In Step 1305, the transmitting mobile terminal executes a map application and outputs map information corresponding to its current location onto the user screen by interworking with the received GPS data. In Step 1307, the user of the transmitting mobile terminal generates a handwriting animation message by using the map information output on the user screen as a background. In Step 1309, upon completion of generation of the handwriting animation message, the transmitting mobile terminal generates a final still image and stores the location information of the transmitting mobile terminal in a particular region of the final still image. In Step 1311, the transmitting mobile terminal encodes the final still image into an image file in a particular format and transmits the image file to the receiving mobile terminal.

The receiving mobile terminal may set an accurate destination by referring to handwriting content of the handwriting animation message reproduced on the map application or may perform a navigation function by searching for a route in a current location. For example, when the transmitting mobile terminal searches for a place of a meeting by using a map application and generates and transmits a handwriting animation message by using the map application based on the found meeting place as a background, the receiving mobile terminal having received the handwriting animation message sets the meeting place indicated on the map application as a destination, searches for a route in a current point where the receiving mobile terminal is located, and thus easily moves to the destination.

While it is assumed that the transmitting mobile terminal and the receiving mobile terminal use the same map application in FIG. 13, the above-described function may be performed between mobile terminals using different map applications if a compatibility problem can be overcome.

Figure 14:
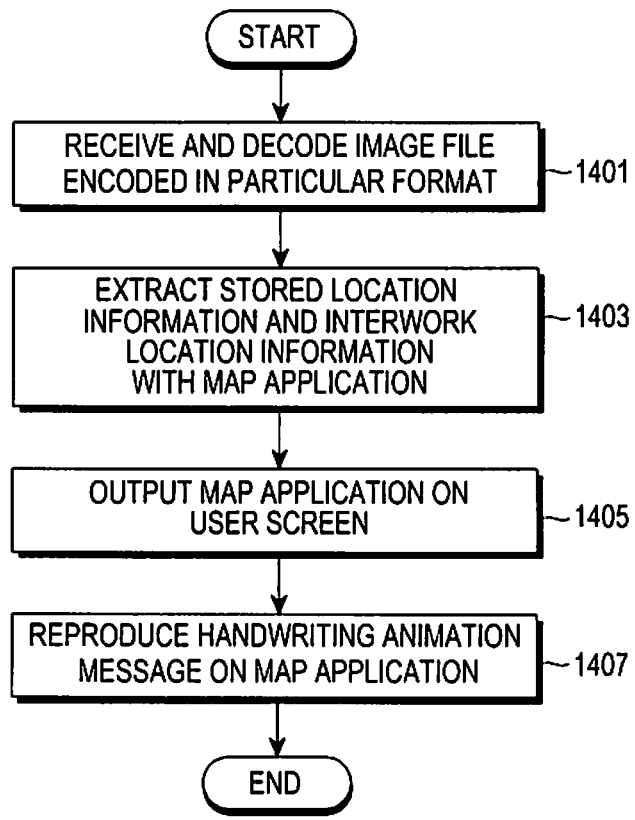
FIG. 14 is a flowchart illustrating a process of reproducing a handwriting animation message with map information as a background image according to an embodiment of the present invention.

FIG. 14 is a flowchart illustrating a process of reproducing a handwriting animation message with map information as a background image according to an embodiment of the present invention.

Referring to FIG. 14, a receiving mobile terminal receives an image file encoded into a particular format and decodes the image file into a final still image in Step 1401. A particular region of the final still image stores location information of a user of a transmitting mobile terminal. In Step 1403, the receiving mobile terminal extracts stored location information and executes a map application to interwork with the extracted location information. In Step 1405, the receiving mobile terminal outputs map information corresponding to a current location of the transmitting mobile terminal on the user screen. In Step 1407, the receiving mobile terminal reproduces a handwriting animation message by using the map information corresponding to the current location of the transmitting mobile terminal as a background.

Figure 15:
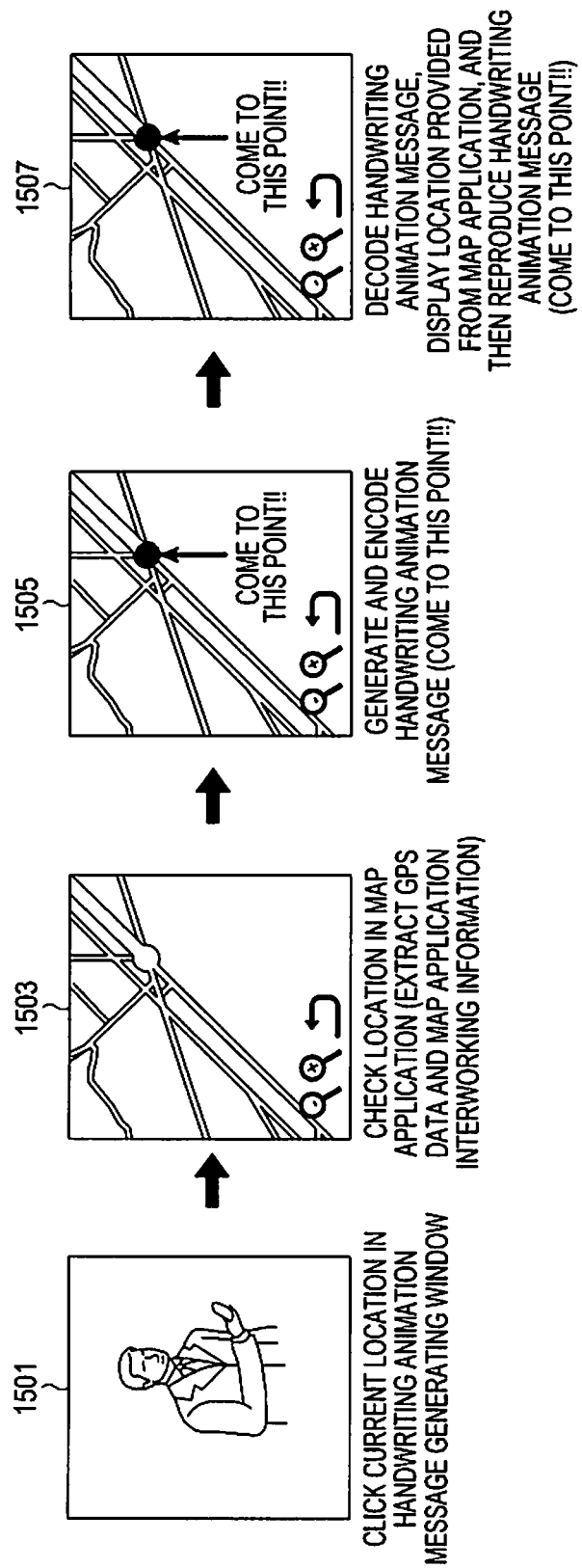
FIG. 15 is a diagram for describing a process of transmitting and receiving a handwriting animation message with map information as a background image according to an embodiment of the present invention.

FIG. 15 is a diagram for describing a process of transmitting and receiving a handwriting animation message with map information as a background image according to an embodiment of the present invention.

Referring to FIG. 15, in Step 1501, a user of a transmitting mobile terminal requests its current location before generating a handwriting animation message on a handwriting animation message generating window. In Step 1503, the transmitting mobile terminal outputs map information corresponding to its current location onto the user screen by interworking the location information received through a GPS receiver with a map application. In Step 1505, the handwriting animation message is generated by using the map information as a background, and upon completion of the generation, the handwriting animation message is encoded into an image file in a particular format and then the image file is transmitted to a receiving mobile terminal. In FIG. 15, an arrow and a handwriting message "Come to this point!!" are generated. In Step 1507, the receiving mobile terminal outputs map information corresponding to the current location of the transmitting mobile terminal onto the user screen by using the location information of the transmitting mobile terminal included in the image file received from the transmitting mobile terminal, and reproduces the handwriting animation message by using the map information as a background. The receiving mobile terminal may set the current location of the transmitting mobile terminal as a destination and perform a navigation function.

According to the present invention, one or more handwriting animation messages and a background image are synchronized as a single group and transmitted, such that the receiving mobile terminal can effectively reproduce content the user of the transmitting mobile terminal desires to express even when the content exceed two pages.

Moreover, a final still image is generated and handwriting stroke information of handwriting content is stored in a particular region of the final still image and then transmitted, whereby the receiving mobile terminal can separate the original background image from the final still image and reproduce the handwriting animation message, without the original background image.

Furthermore, time information and position information of points forming a handwriting animation message are stored in a particular region of a final still image where the handwriting animation message is completed on a particular background image, and they are transmitted to the receiving mobile terminal to reconstruct the particular background image which remains after removal of the handwriting region from the final still image, so that the background image which remains after removal of the handwriting region can be viewed even in a mobile terminal which does not support reproduction of the handwriting animation message.

While the invention has been shown and described with reference to a certain preferred embodiment thereof, it will be understood by those skilled in the art that various changes in form and details may be made therein without departing from the spirit and scope of the invention as defined by the appended claims and equivalents thereof.

What is claimed is:

1. An apparatus for displaying a message, the apparatus comprising:
   a touch screen configured to display a background image and to receive a handwriting input through an area of the touch screen displaying the background image;
   a transmitter configured to transmit a message to a receiving mobile terminal; and
   a controller configured to:
      generate two or more handwriting animation messages each including coordinate information and time information of respective points constructing the handwriting input received on the background image displayed in the touch screen,
      associate the background image and two or more identifiers of the two or more handwriting animation messages,
      generate the message including the background image, the two or more handwriting animation messages, and the two or more identifiers of the two or more handwriting animation messages; and
      transmit the message to the receiving mobile terminal.

2. The apparatus of claim 1, further comprising:
   a memory configured to store at least one of the background image, the two or more handwriting animation messages, and a map application; and
   a Global Positioning System (GPS) receiver configured to receive location information of the apparatus.

3. The apparatus of claim 2, wherein the controller is further configured to extract map information based on the location information by interworking the location information with the map application, and to set the extracted map information as the background image.

4. The apparatus of claim 3, wherein the map information set as the background image includes the location information of the apparatus.

5. The apparatus of claim 1, wherein the controller is further configured to synchronize the two or more handwriting animation messages and the background image as a single group by associating the two or more identifiers each included in the two or more handwriting animation messages and an identifier included in the background image.

6. The apparatus of claim 5, wherein the identifier included in the background image comprises:
a message identification number storing a number to be synchronized as the single group; and
a background image number storing a unique number of the background image.

7. The apparatus of claim 5, wherein the two or more identifiers included in the two or more handwriting animation messages comprise:
a message identification number storing a number to be synchronized as the single group;
a background image number storing a unique number of the background image;
a page number storing an order of reproduction for the two or more handwriting animation messages included in the single group; and
a total page number storing a number of the two or more handwriting animation messages included in the single group.

8. An apparatus for displaying a message, the apparatus comprising:
a touch screen;
a receiver configured to receive a message from a mobile terminal; and
a controller configured to:
receive the message including a background image, two or more handwriting animation messages, and two or more identifiers of the two or more handwriting animation messages,
identify whether the background image and the two or more handwriting animation messages are synchronized as a single group based on the two or more identifiers of the two or more handwriting animation messages,
when it is identified that the background image and the two or more handwriting animation messages are synchronized as the single group, display the background image in the touch screen, and
sequentially display the two or more handwriting animation messages on the background image based on coordinate information and time information of respective points constructing a handwriting input included in the two or more handwriting animation messages.

9. The apparatus of claim 8, further comprising:
a memory configured to store at least one of the background image, the two or more handwriting animation messages, and a map application; and
a Global Positioning System (GPS) receiver configured to receive location information of the apparatus.

10. The apparatus of claim 9, wherein if the location information is included in the background image, the location information is displayed on the background image by interworking with the map application.

11. The apparatus of claim 8, wherein if a background image number included in one of the two or more identifiers is the same as another background image number included in another of the two or more identifiers, the two or more handwriting animation messages are sequentially displayed on the background image corresponding to the background image number, and if the background image number included in the two or more identifiers are empty, the two or more handwriting animation messages are sequentially displayed without the background image.

12. A method for displaying a message in an apparatus, the method comprising:
displaying a background image;
receiving a handwriting input through an area of the touch screen displaying the background image;
generating two or more handwriting animation messages each including coordinate information and time information of respective points constructing the handwriting input received on the background image;
associating the background image and two or more identifiers of the two or more handwriting animation messages;
generating a message including the background image, the two or more handwriting animation messages, and the two or more identifiers of the two or more handwriting animation messages; and
transmitting the message to a receiving mobile terminal.

13. The method of claim 12, further comprising:
storing the background image, the two or more handwriting animation messages, or a map application; and
receiving location information of the apparatus.

14. The method of claim 13, wherein map information based on the location information is extracted by interworking the location information with the map application, and the extracted map information is set as the background image.

15. The method of claim 12, further comprising:
synchronizing the two or more handwriting animation messages and the background image as a single group by associating the two or more identifiers each included in the two or more handwriting animation messages and a identifier included in the background image.

16. A method for displaying a message in an apparatus, the method comprising:
receiving a message including a background image, two or more handwriting animation messages, and two or more identifiers of the two or more handwriting animation messages;
identifying whether the background image and the two or more handwriting animation messages are synchronized as a single group based on the two or more identifiers of the two or more handwriting animation messages;
when it is identified that the background image and the two or more handwriting animation messages are synchronized as the single group, display the background image; and
sequentially displaying the two or more handwriting animation messages on the background image based on coordinate information and time information of respective points constructing a handwriting input included in the two or more handwriting animation messages.

17. The method of claim 16, further comprising separating the two or more handwriting animation messages and the background image from the message.

18. The method of claim 17, wherein separating the two or more handwriting animation messages and the background image comprise separating the two or more handwriting animation messages and the background image by using stroke information of the two or more handwriting animation messages included in the message.

19. The method of claim 16, further comprising:
  storing at least one of the background image, the two or more handwriting animation messages, and a map application; and
  receiving location information of the apparatus.

20. The method of claim 19, wherein if the location information is included in the background image, the location information is displayed on the background image by interworking with the map application.

21. The method of claim 16, wherein if a background image number included in one of the two or more identifiers is the same as another background image number included in another of the two or more identifiers, the two or more handwriting animation messages are sequentially reproduced on the background image corresponding to the background image number, and if the background image number included in the two or more identifiers are empty, the two or more handwriting animation messages are sequentially displayed without the background image.

* * * * *